Sept. 26, 1944.　　　G. A. MILLIKAN　　　2,358,992
OXYGEN METER
Filed June 28, 1941　　　2 Sheets-Sheet 1

INVENTOR
Glenn A. Millikan
BY Robert V. Morse
ATTORNEY

Sept. 26, 1944.   G. A. MILLIKAN   2,358,992
OXYGEN METER
Filed June 28, 1941   2 Sheets-Sheet 2

INVENTOR
Glenn A. Millikan
BY
ATTORNEY

Patented Sept. 26, 1944

2,358,992

UNITED STATES PATENT OFFICE 2,358,992

OXYGEN METER

Glenn A. Millikan, New York, N. Y.

Application June 28, 1941, Serial No. 400,285

11 Claims. (Cl. 88—14)

This invention relates to colorimetry, and is particularly useful in determining the amount of oxygen in the blood. It provides a means by which the depletion of oxygen—as in the case of aviators flying at high altitudes or patients under anesthesia—can be continuously observed, so that appropriate measures may be taken before the danger point is reached. Various other applications in colorimetry will become apparent to those skilled in the art. The objects of the invention are to provide a simple and practical device for purposes such as those stated; to make it applicable to persons having different physical characteristics; to permit frequent checking of the accuracy of the instrument; to protect the person being tested from pain or discomfort; to give greater ease and accuracy of operation; and in general to improve the performance, convenience and utility of such devices.

The general principles upon which the apparatus is based are as follows. It has long been recognized that the hemoglobin of the blood changes color from red toward blue as the oxygen content diminishes. In recent years colorimeter tests involving light passing thru a specimen to fall on a light sensitive cell operating a galvanometer have been developed, so as to give some means of determination independent of the mere judgment of the human eye. To calibrate the results laboratory analyses of blood samples in each instance were required. In order to produce a more direct reading method, and one adaptable to persons of various physical characteristics, the present device uses a system of readings and scales by which coordinated results of sufficient accuracy for most practical purposes can be quickly obtained.

A beam of light can be passed thru a thin part of the body, such as the ear or the web of a finger, to fall upon a light sensitive cell operating a galvanometer. If all ears were alike, the problem would present few difficulties. But the variations in thickness and texture of the tissues in different individuals introduce variations in the light transmitted quite independent of the color of the blood; so that different individuals with equal proportions of oxygen in their blood may produce quite different photo-electric readings. The problem then is to provide a sound basis for calibration independent of such individual peculiarities.

In general the problem is solved in the present apparatus by providing a system which first determines a classification within which the individual subject falls, and selects a calibration scale which will suit that subject within a practical degree of accuracy; and then by direct readings indicates on that scale the percentage of oxygen content in the blood. The particular scientific principles by which this is accomplished will be described more in detail later in the specification.

In the drawings forming part of this specification, Fig. 1 is a schematic view illustrating the general principles of a typical device.

Similar reference numerals refer to similar parts thruout the various views.

Figure 1:
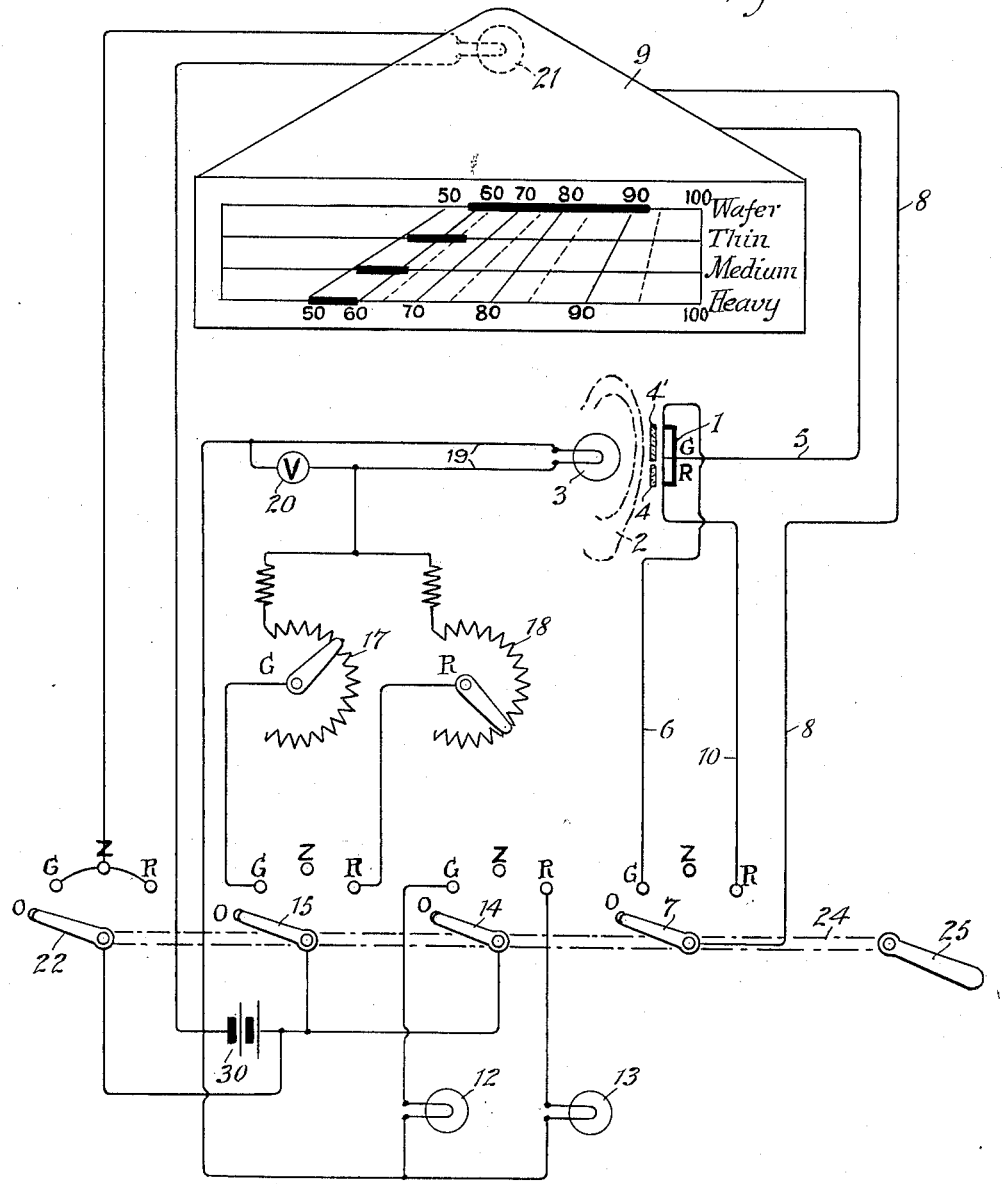

Referring first to Fig. 1, a light sensitive cell 1 embodying separate units capable of responding to different selected colors is placed in proximity to the specimen to be analyzed, such as the human ear 2, thru which light from the electric light bulb 3 passes to energize the light sensitive cell 1. To control the color of the light which is to energize the cell 1, color filters 4 and 4', labelled R for red and G for green respectively, are interposed between the light 3 and the cell 1. The light sensitive cell 1 is of the compound or multiple type, so that part of it responds only to the light falling on it thru the green filter, and another part responds only to the light falling on it thru the red filter. These parts are labelled R for red and G for green, and these letters are also applied to switch terminals, indicator lights, rheostats, and similar parts to be later described, so that the red and green circuits can be readily traced.

The cell 1 is therefore really two light sensitive cells having a common ground wire 5 but otherwise operating independently, one portion being sensitive to green light and the other portion being sensitive to red light. It is the well known property of any light sensitive cell that when light falls upon it an electro-motive force is generated, which is usually capable of operating a measuring instrument such as a galvanometer. When the light thru the green filter 4' falls on the corresponding portion of the cell 1, the circuit is thru the conductor 6 to the terminal of the switch 7 marked G, then thru the conductor 8 to the galvanometer 9, and back thru the ground wire 5 to the cell 1.

When the red portion of the cell 1 is in action, the light after passing thru the red filter 4 falls on the corresponding portion of the cell 1, generating an electro-motive force in accord with the intensity of the red light. When the switch 7 is turned to the terminal R, for the red circuit, the current flows thru the conductor 10, switch 7, and conductor 8 to the galvanometer 9, and back thru the ground wire 5 to the cell 1. There are thus two simple alternative circuits, one energized by red light and the other by green light, either of which may be read on the galvanometer 9, by throwing the switch 7 to the appropriate position. The point marked Z on the switch 7 is used for setting the zero reading of the galvanometer 9; and the point marked O (for "off") is used when the apparatus is entirely shut off. Since the current is generated by the direct action of the light falling on the light sensitive cell, no battery or other external power source is required for this part of the apparatus, these reading circuits being self-contained and independent of the supplementary circuits now to be described.

To assist the operator in using the apparatus, indicator lights 12 and 13 are provided, the light 12 being on when the green circuit is in use and the light 13 being on when the red circuit is in use. These lights are operated by the switch 14, which has four switch points, O (off), R (red), Z (zero set), and G (green), similar to the switch 7.

The light source 3 which supplies the light to the specimen 2 and light cell 1, is preferably an ordinary light bulb of the miniature type, and is controlled by the switch 15, which has four contact points similar to those of switches 7 and 14, that is, marked O (off), G (green), Z (zero set), and R (red). Light sensitive cells are generally much more responsive to red rays than to green, and this would normally necessitate changing the scale or resistance of the galvanometer or other measuring instrument. In order to take readings from both the red and green circuits without changing the galvanometer, means are provided to reduce the intensity of the light source 3 when the red screen is in use; or conversely, to increase the relative intensity of the light source 3 when the green screen is in use.

For this purpose, adjustable resistances 17 and 18 are provided in the circuit of the light bulb 3, and are arranged so that the resistance 17, connected to the green circuit terminal G of the switch 15 is less than the resistance 18, which is connected to the red circuit terminal R of the switch 15. This gives a brighter light at 3 when the switch 15 is at the point G of the green side, and a dimmer light when the switch 15 is on the point R of the red side. Conductors 19 lead to the light bulb 3. A voltmeter 20 is connected across the circuit of the light bulb 3 as an additional means of checking the setting of that light if desired.

If the galvanometer or other reading instrument 9 is of the type using a spot of light as its indicator point, as is generally the case, then a circuit must be provided for the electric light 21 that shines on the galvanometer mirror. This circuit is controlled by the switch 22, which really has only two positions, on and off; but for convenience of manufacture it may be provided with contact points similar to the switches 7, 14 and 15, so that it may be operated by the same shaft; but in the case of the switch 22 all the points G, Z, and R are connected together so that the light 21 remains on regardless of the position of the switch 22, unless it is in the "off" position.

The switches 7, 14, 15 and 22, being of similar mechanical construction, are readily moved in unison by a single shaft 24 indicated by the broken line, which is operated by the handle 25. When this handle 25 moves the switches 7, 14, 15 and 22 from the "off" position to G (green), the galvanometer 9 is put in circuit with that portion of the light sensitive cell 1 which is under the green color filter 4'; the green indicator light 12 is turned on; the light source 3 is turned up to a higher intensity; and the galvanometer reading light 21 is turned on. When the handle 25 moves the switches 7, 14, 15 and 22 to the "zero" position, the light sensitive cell circuits are disconnected, as is the light source 3, but the galvanometer light 21 remains on, so that the galvanometer can be set for zero reading, to give it the proper preliminary adjustment. When the handle 25 moves the switches 7, 14, 15 and 22 to the R (red) position, the galvanometer is connected to that portion of the light sensitive cell energized by the light thru the red color filter 4; the light source 3 is dimmed to a degree previously set by the resistance 18; and the galvanometer light 21 remains on to provide the reading spot or indicator. Thus the zero setting, and the readings produced by either the red or the green light are conveniently obtained, and their presence indicated, by simultaneous switch movements all operated by a single handle.

The electricity for the indicator lights 12, 13, the light source 3, and the galvanometer light 21, may be obtained from any suitable source indicated conventionally by the reference numeral 30, ordinary electric light lines being generally used when available.

The light sensitive cell 1 and color filters 4 and 4' have been described as simply red and green units set close together so as to utilize the same light source 3. The green filter and cell are made larger in area than the red filter and cell, because of the fact that red light activates the light sensitive cell much more strongly than green, as previously stated; and this difference in the green and red areas helps to bring the galvanometer readings into the same general order of magnitude and avoids the necessity for changing the galvanometer scale or resistance, particularly when this is combined with the alteration of the light source intensity above described.

Figure 2:
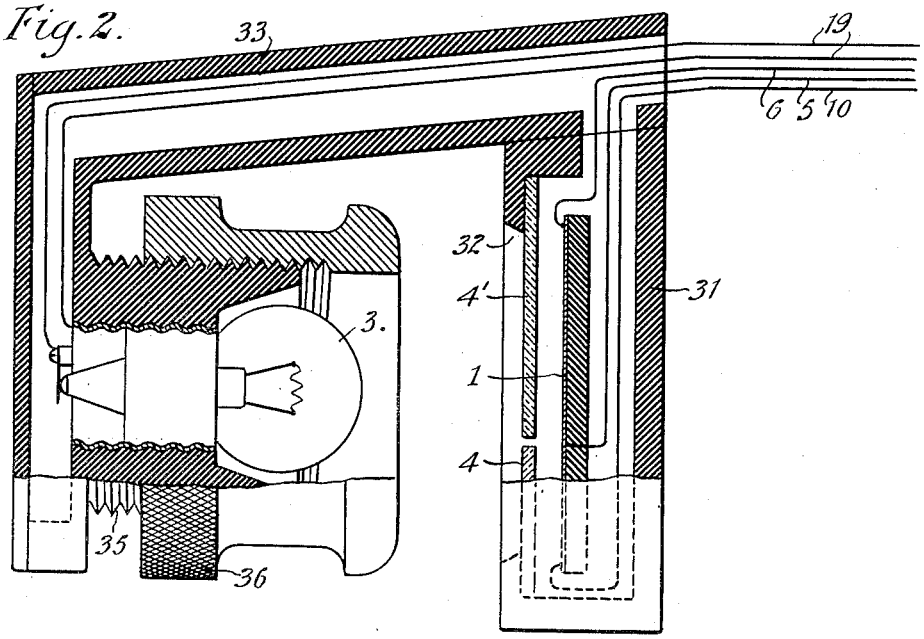
Fig. 2 is a side elevation view mostly in section of a light sensitive cell and lamp unit which may be clamped to the ear or other desired specimen.
Figure 3:
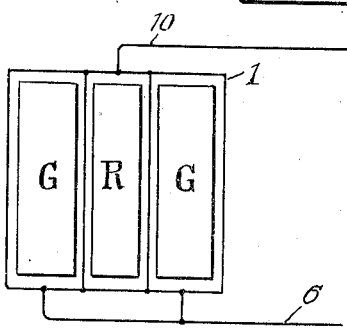
Fig. 3 is a front view of one form of the red and green filters used with the light sensitive cell.

The difference between the red and green areas will best be seen in Fig. 2 and Fig. 3 which show in greater detail a light cell unit more simply shown in Fig. 1. Referring now to Fig. 2, the housing 31 contains the color filters 4 and 4' and the light sensitive cell 1, which is conventionally shown in Fig. 2 and in somewhat greater detail in the front view of Fig. 3. The housing 31 is preferably made of hard rubber, plastic or similar smooth material so that it may be placed against the ear without discomfort; and is provided with an opening 32 to admit light from the electric light bulb 3. This bulb 3 is supported on a hollow arm 33 extending from the housing 31, thru which the wires 19 pass to supply electricity to the bulb 3. The end of the arm 33 extends back toward the housing 31 and is provided with a threaded neck 35 on which is screwed a knurled ring 36 having smoothly rounded surfaces on the side adjacent the housing 31, so that it may be clamped on the human ear or other thin part of the body without discomfort. In use, the thin upper portion or shell of the ear is slipped between the housing 31 and the ring 36, and the latter is then screwed up until it is gently clamped on the ear. The pressure should not be enough to impede the circulation, but only enough to hold the device lightly in place and exclude light other than that from the bulb 3. A gentle pressure is sufficient and is not uncomfortable.

While the apparatus may be constucted with only one green light area and one red light area, it is generally desirable to construct the green light area in two parts connected together, with the relatively small red light area located in between, as shown in Fig. 3, where the green filter and cell areas are labelled G and the red filter and cell area is labelled R. This provides a more uniform distribution and guards against errors which might be induced by local variations in brightness on one side. While such an arrangement is mechanically made up of three or more parts, in principle they are the equivalent of but two regions, since all the green areas are connected to the same conductor 6 and so act as one; and similarly, the red areas, if they were divided, would all act as one by being connected to the same conductor 10.

The apparatus and the principles which have been described would suffice to determine blood color and thereby oxygen content under most conditions were it not for the fact that variations in the thickness and tissue of the ear in different individuals cause wide variations in the light transmitted thru the ear, irrespective of whether the blood in the ear is the same color. If all ears had the same thickness and texture, relatively simple readings would suffice. But that not being the case, it is necessary to provide means to overcome errors induced by such individual peculiarities.

The present solution to this portion of the problem involves the following general steps. (1) Providing a means for classifying the specimens or ears according to their physical characteristics of thickness and texture and other individual peculiarities affecting the transmission of light, independent of the color of the blood, so that the classifications would not be affected by the oxygen content of the moment. (2) Having then segregated the ears into groups which act alike, the present invention provides separately calibrated scales for each group, on which can be correctly read the oxygen content of any individual in that group, at any particular moment.

Figure 4:
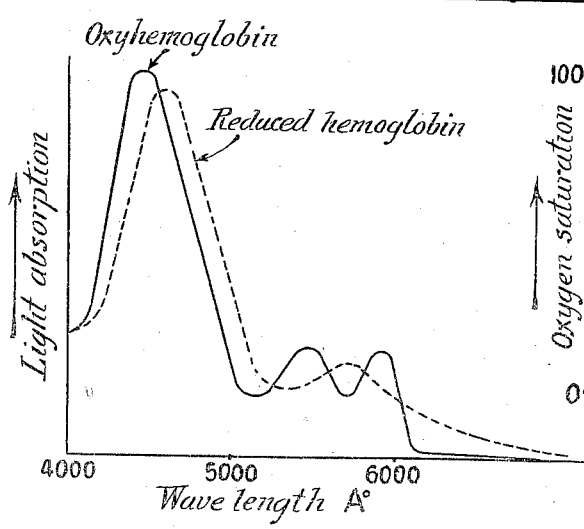
Fig. 4 is a chart showing the comparative light absorption of hemoglobin when high in oxygen and when reduced in oxygen, from which characteristics the function of the green filter is deduced.

The scientific principles on which this solution is based will be better understood after referring to Fig. 4, which is a typical chart showing the light absorption of oxyhemoglobin, or blood high in oxygen—indicated in solid lines— as compared with reduced hemoglobin, or blood low in oxygen, shown in broken lines, both curves being plotted with light absorption as the ordinates and light wave length, A., that is color, as the abscissae. In the chart the spectrum runs from red on the right to the blue violet on the left. It will be seen that on the right the red light is absorbed much more by the reduced hemoglobin than by the oxyhemoglobin, as would be expected from the fact that the blood with more oxygen is redder in color and so transmits red light more freely. On the other hand, the left portions of the curves indicate that with the bluer light the oxyhemoglobin absorbs more, that is, is more resistant to the passage of blue light than blood reduced in oxygen, which is bluer. While these characteristics are naturally to be expected, the interesting fact appears in the middle of the curves that the two curves repeatedly cross each other, with the oxyhemoglobin sometimes above and sometimes below. Where they cross, the two curves have of course the same value; which means that there are certain colors or wave lengths which are absorbed equally by either oxyhemoblogin or reduced hemoglobin; that is, that light of a certain color will be absorbed to the same degree regardless of whether the blood is high or low in oxygen. Since with light of that color the oxygen content does not enter into the problem, that particular color can be used to measure the various other physical characteristics or peculiarities that retard the passage of light, such as thickness, texture of the tissues, color of the skin, etc. In general it may be said that the amount of the selected green light transmitted is determined almost entirely by the amount of blood in the ear, independent of how much oxygen it contains. The green light thus measures what may be termed the "blood thickness" of the ear.

While any one of the cross-over points of the two curves might be used, it is preferable with human subjects to use the cross-over point at about 5900 A., which we have called the "green" light. Using this color, which is absorbed in the same degree with any oxygen content of the blood, we test out various individual ears and find some transmit the light rather freely, and others not so freely, according generally as they are thin or thick or vary in texture. The transmission of the green light, as indicated by the action of the light sensitive cell 1 on the galvanometer 9, shows the general resistance to light attributable to the personal characteristics of the individual, aside from the oxygen content of his blood; and we use such a determination of the "blood thickness" of the ear to select the proper scale suitable for that type of person.

Figure 5:
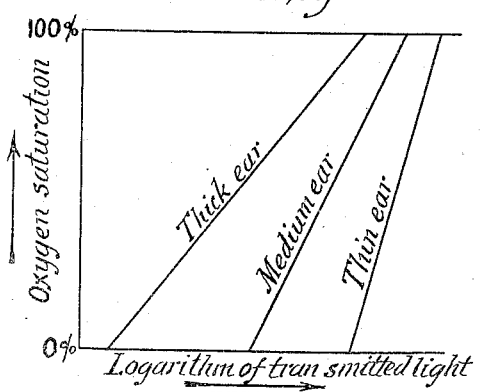
Fig. 5 shows the logarithmic curves of transmitted light and oxygen saturation for various types of ears, labelled "thick ear," "medium ear" and "thin ear"; from which the necessity for different scales for different types of ears will be seen.

Referring now to Fig. 5, which shows the oxygen saturation plotted against the logarithm of the transmitted light, for various types of ears labelled "Thick ear," "Medium ear," and "Thin ear"—it will be seen that the curves are not only spaced from each other, but are not parallel, that is, have different slopes. This means that the calibration curves for such different types of ears will be quite different; and any single scale on the galvanometer reading directly in terms of percent oxygen in the blood would not be accurate for all types of people. In practice it has been found that by using a reasonable number of scales, preferably four, the oxygen content can be directly read with a sufficient degree of accuracy for most practical purposes.

Accordingly the galvanometer 9 is provided with four separately calibrated scales labelled "Wafer," "Thin," "Medium," and "Heavy," as shown in Fig. 1, with curves running from 50% to 100% oxygen content crossing them in a generally diagonal direction. In operating the apparatus these are used in the following manner.

First to warm up and properly dilate the blood vessels in the ear, the switches are turned to the green position, which it will be recalled makes the lamp 3 hotter than in the red position. This green position is usually too hot for comfort if left on continuously, and therefore during the initial warming up period of from five to fifteen minutes, the light is turned on intermittently and left on each time until the ear begins to feel uncomfortable. Once the ear is properly vasodilated, as indicated by a steady reading on the galvanometer, the dimmer red light should be warm enough to keep it so, and the green need only be flashed on occasionally—say at one minute to five minute intervals—to see that the blood thickness of the ear has not changed. This reading with the switch on "green" shows how much blood there is between the lamp 3 and the photo-cell 1, that is, the "blood thickness" of the ear.

When this green reading has arrived at a steady value, we find it within one or another of the heavy black blocks shown staggered along the four scales of the galvanometer. For example, if it were in the region of the figures 60–90 on the upper scale, it would fall within the block of the scale labelled "Wafer"; if the green reading were in the region of 50–60 on the upper scale, it would fall within the block on the scale labelled "Thin"; if in the region of 60–70 on the lower scale it would lie in the block of the scale labelled "Medium"; and if in the region of 50–60 on the lower scale, it would lie in the block of the scale labelled "Heavy." With fewer or more scales the blocks would be different but the principle would be the same.

Since the blocks do not overlap, the galvanometer indication on the "green" setting is always within one block or another, and a glance at the scales suffices to select the scale to be used. Whichever scale has the block in which the "green" reading falls is the scale on which the percent oxygen is read when the "red" setting is used.

The proper scale having been so determined, the switch is then moved to the "red" position. The four scales are so arranged that in each case 100% saturation corresponds to the full scale deflection of the measuring instrument. The adjustment of the chosen scale is obtained by varying the incident "red" light intensity by means of the rheostat 18 until the correct reading for a known oxygen content (100% with oxygen or 96% with air) is obtained for one point on the scale. Any other degree of oxygen can then be read directly on that scale. The reading is quick, almost instantaneous; and by holding one's breath, can be seen to drift down from a normal content of about 96% to say 80%, 70% or lower, depending on the depletion of oxygen occurring. This rapid and continuous reading of the oxygen content of the blood, without taking blood samples, is the chief advantage of the instrument.

Care should be taken that carbon monoxide is not present, as its effect on the color of the blood is similar to oxygen.

In order to compare one ear with another, the incident light, in the "green" position of the switch, must always be the same. This is secured by initially placing a neutral filter of constant transmission in the position of the ear and then adjusting the brightness of the lamp until the instrument comes to a predesignated mark on the calibration scale, determined by the original calibration from known data. This method of adjustment automatically compensates for slow changes in the lamp, voltage, lamp luminosity, and sensitivity of the light sensitive cell. It is advisable to check this incident "green" light reading at the beginning and end of a run to see that it has not changed by more than a few percent.

Beer's law, as applied to a mixture of two substances, such as hemoglobin and oxyhemoglobin, states that for a monochromatic light which is differently absorbed by them, the logarithm of the transmitted light is linearly related to the fraction of one substance in the mixture. Beer's law has been found to hold adequately even for the optically complex system of blood in the human ear, so long as the amount of blood in the ear remains fairly constant, as determined by the "green" reading. It should be emphasized that there are many reasons why Beer's law should not hold in a system so far removed from that of a clear solution of pigment in a parallel sided trough, and the happy validity of the law for the human ear within the desired degree of accuracy does not justify its extension to other tissues without independent check.

It follows from Beer's law that there is a straight line relationship between the logarithm of the transmitted light and the percent saturation. This, however, is only true if both the intensity of the incident light and the total pigment concentration (hemoglobin plus oxyhemoglobin) remain unchanged. If the light intensity is increased, this straight line is shifted to the right in Fig. 5 without change of slope, while if the pigment becomes more concentrated its slope is decreased. The position of the line can be uniquely determined if its slope is known and if one point on it is determined experimentally. The first quantity can be predicted from the "green" reading, while the second datum can be obtained either by forcing the saturation up to 100% by breathing oxygen or by assuming the saturation is 96% when air is breathed normally.

The effective wave lengths depend both upon the transmission characteristics of the filters used and upon the spectral sensitivities of the light sensitive cell. The choice of the color filters therefore depends to some extent on the particular photocell used. For the red light an effective wave length is desired which is very differently absorbed by reduced hemoglobin than by oxyhemoglobin. A number of regions might be used, but for measurements on man the most suitable region is from 6200 A. to 6600 A. For example, a "Wratten No. 29" filter having a control wave length of 6400 A. was found to be satisfactory. For the green light an effective wave length is desired which is equally absorbed by oxyhemoglobin or reduced hemoglobin. Such a region lies between 5200 A. and 6000 A., and various other points as indicated in Fig. 4. A band in the neighborhood of 5900 A., obtained with "Wratten No. 61" filter has been found satisfactory. By keeping in mind the principles above outlined various suitable selections can be made.

The apparatus has been described in the form of a single unit capable of handling one person at a time. Where it is desired to test a number of persons simultaneously, multiple types can be made by the mere duplication or multiplication of the corresponding parts.

While I have in the foregoing described certain particular embodiments of the invention, it will be understood that they are merely for purposes of illustration to make clear the principles thereof, and that the invention is not limited to the particular form described, but is subject to various modifications and adaptations in different installations as will be apparent to those skilled in the art without departing from the scope of the invention as stated in the following claims.

I claim:

1. In an oxygen meter, the combination of a light source, a color filter and light sensitive cell for the selection of types operable by said light source and responsive to wave lengths which are equally absorbed by oxyhemoglobin and reduced hemoglobin, a second color filter and light sensitive cell for oxygen determination operable by said light source and responsive to wave lengths which are absorbed differently by reduced hemoglobin than by oxyhemoglobin, a measuring instrument, a switch for connecting the measuring instrument to either light sensitive cell so that it is operable by either of said cells, said instrument having different scales with marks at different locations thereon to indicate which type scale is to be used, said indication being made by operation of the first mentioned filter and cell, and different oxygen calibrations on said scales, whereby the oxygen content may be directly read by operating the instrument by the second color filter and cell and reading the oxygen content on the scale previously indicated.

2. In a colorimeter, the combination of a light filter and a light sensitive cell responsive to green light which is equally absorbed by oxyhemoglobin and reduced hemoglobin, the type of the specimen being determined by its absorption of green light, a second light filter and light sensitive cell responsive to red light, a light source for said filters and cells, an electrical measuring instrument operable by either of said cells, said instrument having differently calibrated scales for different types of specimens, said calibrations indicating the absorption by the specimen of the red light, said instrument also having type indicators on said scales for use with the green light to determine which scale is to be used, said types being independent of the oxygen content of hemoglobin due to the equal light absorption, whereby direct readings of the red light absorption may be made on the proper scale selected according to the green light absorption.

3. In an oxygen meter, the combination of a light source, a green color filter and light sensitive cell, a red color filter and light sensitive cell, a measuring instrument for said cells, a rheostat in circuit with the light source to dim it when the red filter and cell are in use, a lesser rheostat in circuit with the light source to brighten it when the green filter and cell are in use, and a multiple switch mechanism to connect said rheostats in their respective circuits simultaneously with the connection of the respective light sensitive cells to the measuring instrument, to assist in obtaining deflections at the measuring instrument of the same general order of magnitude.

4. In an oxygen meter, the combination of a light source, a color filter and light sensitive cell for the selection of types operable by said light source and responsive to wave lengths which are equally absorbed by oxyhemoglobin and reduced hemoglobin, a second color filter and light sensitive cell for oxygen determination operable by said light source and responsive to wave lengths which are absorbed differently by reduced hemoglobin than by oxyhemoglobin, means for clamping said light source, filters and cells on the ear of the subject to be measured, a measuring instrument operable by either of said cells, said instrument having different scales with marks at different locations thereon to indicate which type scale is to be used, said indication being made by operation of the first mentioned filter and cell, and different oxygen calibrations on said scales whereby the oxygen content may be directly read by operating the instrument by the second color filter and cell and reading the oxygen content on the scale previously indicated, means for increasing the brightness of the light source when the first color filter and cell is used and means for reducing the brightness when the second filter and cell is used, a switch selectively connected to either light sensitive cell and the measuring instrument, a second switch connected to the means for rendering operative the brightness control means of the light source according to which filter and cell is used, and means for operating said switches simultaneously.

5. In an oxygen meter, means for obtaining electrical indications comprising in combination a light source, a red light filter and light sensitive cell, a green light filter and light sensitive cell, said green filter and cell being of greater area than the red filter and cell whereby effects of the same general order of magnitude are obtained when applied to oxygen determination in the blood, means for attaching said light source, filters and cells to the ear, whereby they may respond to the color of the blood in the ear, and a measuring instrument operable by either of said cells.

6. In an oxygen meter, means for obtaining electrical indications comprising in combination a light source, a red light filter and light sensitive cell, a green light filter and light sensitive cell, said green filter and cell being of greater area than the red filter and cell, a measuring instrument operable by either of said cells, and means for increasing the brightness of the light source when the green filter and cell is used and for reducing the brightness when the red filter and cell is used, whereby the same general scale of measurement may be used with either the red or the green light indications when applied to oxygen determination in the blood.

7. In an oxygen meter, the combination of a light source, a color filter and light sensitive cell for the selection of types operable by said light source and responsive to wave lengths which are equally absorbed by oxyhemoglobin and reduced hemoglobin, a second color filter and light sensitive cell for oxygen determination responsive to wave lengths which are absorbed differently by reduced hemoglobin than by oxyhemoglobin, means for clamping said light source, filters and cells on the ear of the subject to be measured, a measuring instrument operable by either of said cells, said instrument having different scales with marks at different locations thereon to indicate which type of scale is to be used, said indications being made by operation of the first mentioned filter and cell, and different oxygen calibrations on said scales, whereby the oxygen content may be directly read by operating the instrument by the second color filter and cell and reading the oxygen content on the scale previously indicated, means for increasing the brightness of the light source when the first color filter and cell is used and means for reducing the brightness when the second filter and cell is used, a switch selectively connected to either one of the light sensitive cells and the measuring instrument, a second switch connected to the means for rendering operative the brightness control means of the light source according to which filter and cell is used, means for indicating which light sensitive cell is in use, a third switch for operating the last mentioned indicating means, and means for operating the three switches simultaneously.

8. In an oxygen meter, the combination of a green responsive photo-electric system for classifying human ears into types, a measuring instrument having separate scales for different types, and a red responsive photo-electric system for indicating on the scale determined by use of the green system the degree of oxygen saturation of the blood, and switches whereby either photo-electric system may be connected to the measuring instrument.

9. In an oxygen meter, the combination of a light source, a green color filter, a red color filter, duplex light sensitive means selectively responsive either to green light which is equally absorbed by oxyhemoglobin and reduced hemoglobin or to red light from said light source and filters for producing electric current, a measuring instrument for said current, different scales on said instrument, the instrument when operated by the green light serving as an indicator to show which scale should be used, said scales being calibrated to show the oxygen content of the blood as indicated by its color, the oxygen reading being obtained by the operation of the red light, and switches for selectively connecting either the green responsive light sensitive means or the red responsive light sensitive means to the measuring instrument.

10. In an oxygen meter, the combination of a light source, a color filter and light sensitive cell for oxygen determination in the blood responsive to wave lengths which are absorbed differently by reduced hemoglobin than by oxyhemoglobin, another filter and light sensitive cell responsive to wave lengths which are equally absorbed by oxyhemoglobin and reduced hemoglobin to determine types by characteristics independent of the oxygen content of the blood, and a measuring instrument alternately operable by either one of the above mentioned light sensitive cell and filter combinations to indicate the oxygen content of the blood of the different types of individuals to be measured.

11. In an oxygen meter, the combination of a light source, a color filter and light sensitive cell for oxygen determination in the blood responsive to wave lengths which are absorbed differently by reduced hemoglobin than by oxyhemoglobin, another filter and light sensitive cell responsive to wave lengths which are equally absorbed by oxyhemoglobin and reduced hemoglobin to determine types by characteristics independent of the oxygen content of the blood, means for attaching said light sensitive cells and color filters to the ear so that they may respond to the light transmitted by the ear, and a measuring instrument alternately operable by either one of the above mentioned light sensitive cell and filter combinations to indicate the oxygen content of the blood of the different types of individuals to be measured.

GLENN A. MILLIKAN.